United States Patent [19]
Seshan et al.

[11] Patent Number: 5,919,255
[45] Date of Patent: Jul. 6, 1999

[54] METHOD AND APPARATUS FOR PROCESSING AN INTERRUPT

[75] Inventors: Nat Seshan, Houston; Douglas E. Deao, Brookshire; Gary L. Swoboda, Sugarland, all of Tex.

[73] Assignee: Texas Instruments Incorporated, Dallas, Tex.

[21] Appl. No.: 08/815,262

[22] Filed: Mar. 12, 1997

[51] Int. Cl.$^6$ ........................................................ G06F 9/46
[52] U.S. Cl. .............................. 710/262; 710/265; 714/37
[58] Field of Search .................................... 395/735, 738, 395/739, 740, 591, 183.09, 183.1, 183.13; 710/260, 262, 265, 266, 267; 712/244; 714/33, 34, 37

[56] References Cited

U.S. PATENT DOCUMENTS

| | | | |
|---|---|---|---|
| 3,984,820 | 10/1976 | Stanley et al. | 395/738 |
| 5,471,620 | 11/1995 | Shimizu et al. | 395/738 |
| 5,535,397 | 7/1996 | Durante et al. | 395/740 |

*Primary Examiner*—Glenn A. Auve
*Attorney, Agent, or Firm*—J. Dennis Moore; Richard L. Donaldson

[57] ABSTRACT

The invention provides a method for interrupting processing by a processor. The method includes the step of requesting an analysis interrupt by setting a bit in a register in the processor (119), the bit associated with an analysis interrupt, the analysis interrupt having a configurable priority. The method also includes the step of detecting the analysis interrupt request. The method further comprises assigning an assigned priority level (114) to the analysis interrupt from a range of priority levels and processing the analysis interrupt (124) based on the assigned priority level.

The invention also provides a processor having a memory unit (14, 16) and a central processing unit (12) operable to access the memory unit. The central processing unit (12) includes an interrupt priority parameter storage system (80) for storing an interrupt priority parameter. The central processing unit further includes a configurable interrupt detection system (36) operable in combination with the central processing unit to detect a configurable interrupt. The central processing unit also includes an interrupt handling system (38) operable in combination with the central processing unit to process a detected configurable interrupt with a first priority level if the interrupt priority parameter has a first value and further operable to process the detected configurable interrupt with a second priority level if the interrupt priority parameter has a second value, the first priority level different from the second priority level and the first value different from the second value. The central processing unit also includes at least three separate interrupt return pointer registers (74, 76, 78) for storing addresses associated with resuming processing of the processor interrupted by an interrupt.

21 Claims, 5 Drawing Sheets

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | RESERVED | | | | | | | | |
| 15 | 14 | 13 | 12 | 11 | 10 | 9 | 8 | 7 | 6 | 5 | 4 | 3 | 2 | 1 | 0 |
| IF15 | IF14 | IF13 | IF12 | IF11 | IF10 | IF9 | IF8 | IF7 | IF6 | IF5 | IF4 | MSGIF | AIF | NMIF | RSTF |

FIG. 4

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | RESERVED | | | | | | | | |
| 15 | 14 | 13 | 12 | 11 | 10 | 9 | 8 | 7 | 6 | 5 | 4 | 3 | 2 | 1 | 0 |
| IS15 | IS14 | IS13 | IS12 | IS11 | IS10 | IS9 | IS8 | IS7 | IS6 | IS5 | IS4 | MSGIS | AIS | RSV | RSV |

FIG. 5

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | RESERVED | | | | | | | | |
| 15 | 14 | 13 | 12 | 11 | 10 | 9 | 8 | 7 | 6 | 5 | 4 | 3 | 2 | 1 | 0 |
| IC15 | IC14 | IC13 | IC12 | IC11 | IC10 | IC9 | IC8 | IC7 | IC6 | IC5 | IC4 | MSGIC | AIC | RSV | RSV |

FIG. 6

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | RESERVED | | | | | | | | |
| 15 | 14 | 13 | 12 | 11 | 10 | 9 | 8 | 7 | 6 | 5 | 4 | 3 | 2 | 1 | 0 |
| IE15 | IE14 | IE13 | IE12 | IE11 | IE10 | IE9 | IE8 | IE7 | IE6 | IE5 | IE4 | MSGIE | AIE | NMIE | 1 |

FIG. 7

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | | | | | | | | | |
| 15 | 14 | 13 | 12 | 11 | 10 | 9 | 8 | 7 | 6 | 5 | 4 | 3 | 2 | 1 | 0 |
| | | | | | | | | | | | | | PRI | | |

METHOD AND APPARATUS FOR PROCESSING AN INTERRUPT

RELATED APPLICATIONS

This application is related to co-pending application Ser. No. 08/788,751, entitled Method and Apparatus for Selectively Detecting a Left-Most Bit, both applications having the same assignee.

TECHNICAL FIELD OF THE INVENTION

This invention relates generally to the field of digital signal processors and more particularly to a method and apparatus for processing an interrupt.

BACKGROUND OF THE INVENTION

Digital signal processors are well known devices for performing high-speed data manipulations. Digital signal processors often include circuitry directed to handling interrupts. Interrupts request attention from the digital signal processor and can be passed to the processor by either hardware or software. An interrupt conventionally causes the processor to suspend its current operations, save the status of its work, and transfer control to a special routine called an interrupt handler that causes a particular set of instructions to be carried out. A table stored in the processor's memory contains the address of a corresponding routine for each interrupt. The addresses are called pointers because they point to the beginning of the interrupt handlers.

Interrupts conventionally occur for a variety of reasons such as service requests from hardware devices and errors in processing. When a processor receives interrupt requests from more than one source, a hierarchy of interrupt priorities determines which of the interrupts is handled first. The hierarchy is conventionally designated by the design of the processor. If a constant stream of interrupt requests would disrupt or complicate processing at a critical point, the interrupts often may be temporarily disabled.

One type of interrupt is an analysis interrupt. An analysis interrupt is used to analyze the processor state while it is performing its functions, thus providing debugging capability. Thus, an analysis interrupt provides a mechanism for providing real time statistics concerning a processor's performance. An analysis interrupt may be originated by a host processor or may be generated internally. In either case, the analysis interrupt requires some of the processor's processing capabilities. Examples of information that may be obtained through an analysis interrupt include the contents of a portion of the processor's memory, the contents of one of its registers, or the location of the processor in executing a piece of software.

Because digital signal processors often operate in real time environments, it is important for the processor to accomplish its tasks in a timely fashion. Therefore, analysis interrupts, which require some of the processor's processing capabilities, are conventionally secondary to the functional tasks of the processor and are designated to have a low priority. The low priority status of analysis interrupts may preclude the rapid acquisition of analysis data. This can cause problems because analysis data may be required in a more timely fashion than is available through conventional low priority interrupts. However, designating analysis interrupts as high priority may result in poor performance by the processor if the processor requires the majority of its resources for other tasks.

Prior processors have therefore incorporated analysis interrupts having a configurable priority. One prior processor includes a priority bit stored in a register that is indicative of the priority assigned to an analysis interrupt. In that processor, if the priority bit has a first value, an analysis interrupt is assigned the lowest priority and is maskable. If the priority bit has a second value, an analysis interrupt is assigned the highest priority and is non-maskable. That prior processor also includes a stack for storing addresses of the next execute packets that were not executed due to interruption by an interrupt, such as an analysis interrupt or a standard interrupt. A stack is used because, since an interrupt may interrupt processing of a lower priority interrupt, multiple addresses of program locations may have to be stored.

The use of a stack to store memory locations of programs that were not executed due to an interrupt has been found, however, to be detrimental to the performance of a processor. The use of a stack requires a significant number of memory accesses over a large number of clock cycles and therefore can slow processing by the processor. In the same prior processor incorporating a configurable priority analysis interrupt, in order to generate an analysis interrupt, a user conventionally modifies the software operation code in memory to include a software trap instruction. The software trap instruction initiates the analysis interrupt. Such a procedure of modifying the software operation code to initiate an analysis interrupt may be awkward for an end user of the processor.

SUMMARY OF THE INVENTION

Therefore, a need has arisen for a new method and apparatus that addresses the disadvantages and deficiencies of the prior art. The invention comprises a method and apparatus for processing an interrupt.

According to one embodiment of the method of the invention, the method comprises the step of requesting an analysis interrupt by setting a bit in a register in the processor. The bit is associated with an analysis interrupt, and the analysis interrupt has a configurable priority. The method also includes the step of detecting an analysis interrupt. The method further comprises assigning an assigned priority level to the analysis interrupt from a range of priority levels and processing the analysis interrupt based on the assigned priority level.

According to another aspect of the invention, a processor is provided having a memory unit and a central processing unit operable to access the memory unit. The central processing unit includes an interrupt priority parameter storage system for storing an interrupt priority parameter and a configurable interrupt detection system operable in combination with the central processing unit to detect a configurable interrupt. The central processing unit further includes an interrupt handling system operable in combination with the central processing unit to process a detected configurable interrupt with a first priority level if the interrupt priority parameter has a first value and further operable to process the detected configurable interrupt with a second priority level if the interrupt priority parameter has a second priority level, the first priority level being different from the second priority level. The central processing unit also includes at least three separate interrupt return pointer registers for storing addresses associated with resuming processing of the processor interrupted by an interrupt.

The invention provides several technical advantages. For example, according to the invention, a processor may be used in applications requiring the majority of the resources of the processor while allowing some low priority interrupts for debugging purposes that will not disrupt the operation of the processor. In other applications, the same processor can accept high priority interrupts for analysis purposes where timely analysis data is desired. Thus analysis of the processor's performance may be performed without unduly disrupting the performance of the processor. These advantages may be experienced without reducing the performance of the processor due to the use of a stack that may have previously been required for processors having configurable interrupts. Moreover, analysis interrupts may be generated more simply through the use of an analysis set register, thereby making the processor easier to use.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

An embodiment of the present invention and its advantages are best understood by referring to FIGS. 1 through 9 of the drawings, like numerals being used for like and corresponding parts of the various drawings. This application is related to co-pending application Ser. No. 08/788, 751, entitled Method and Apparatus for Selectively Detecting a Left-Most Bit, assigned to Texas Instruments of Dallas, Tex., which is incorporated herein by reference.

Figure 1:
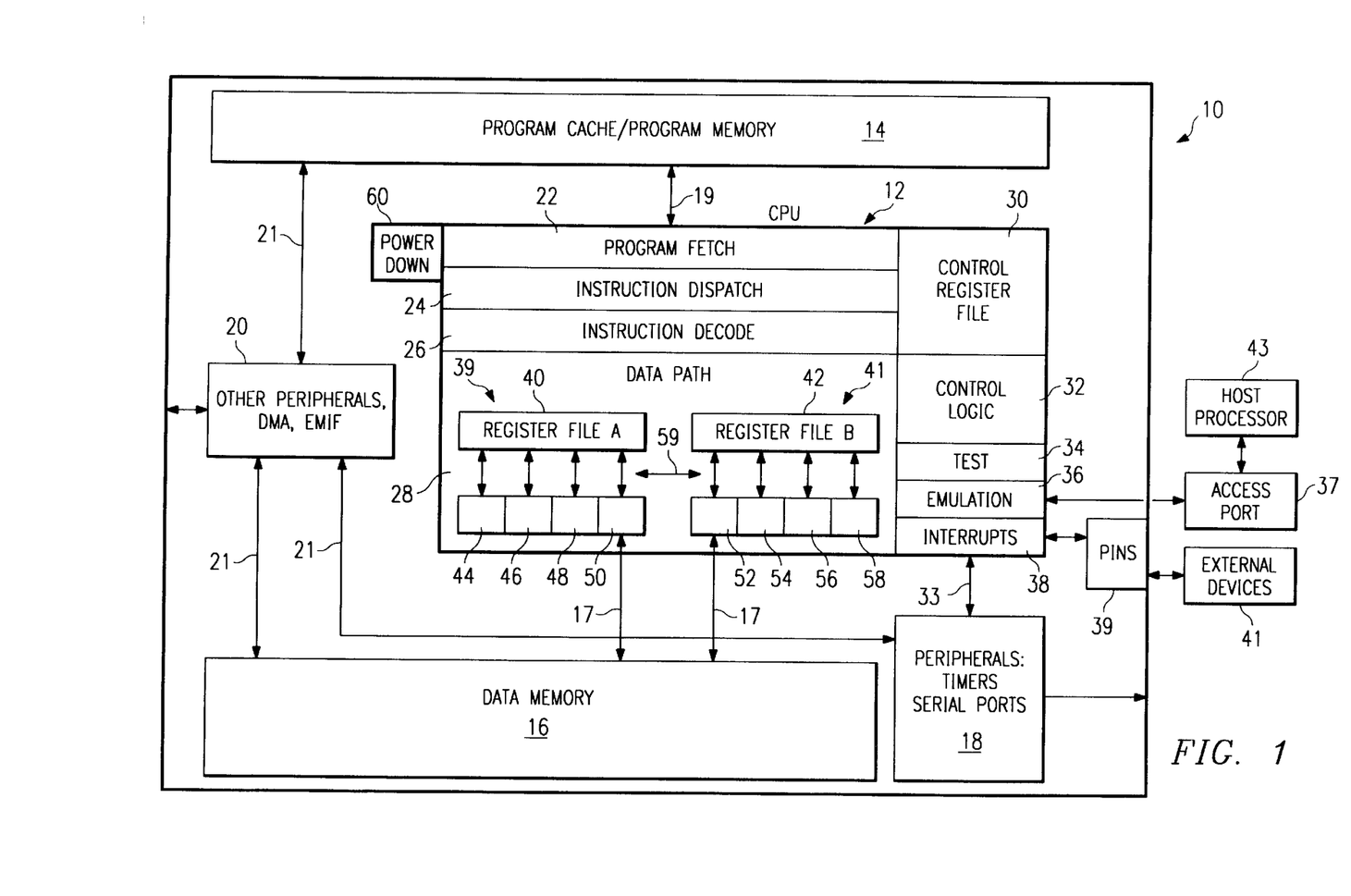
FIG. 1 is a block diagram of a digital signal processor according to one embodiment of the invention and also illustrates additional devices connected to the digital signal processor.

FIG. 1 is a block diagram of a digital signal processor 10 according to one embodiment of the invention and additional devices connected to the digital signal processor 10. Digital signal processor 10 includes a configurable priority interrupt system that allows an analysis interrupt to have varying priority. Varying the priority of an analysis interrupt is desirable because it allows users to receive debugging information quickly in certain applications, but allows digital signal processor 10 to devote the majority of its resources to other tasks in applications where the receipt of debugging information can be delayed and where processing of analysis interrupts would adversely affect the performance of digital signal processor 10. An analysis interrupt may be originated externally by a host processor, such as host processor 43. Moreover, in one embodiment an analysis interrupt may be generated manually by setting a bit in an interrupt set register. The capability for manual generation of an analysis interrupt facilities generating analysis interrupts by an end-user. Emulation system 36 detects analysis interrupts and passes the analysis interrupt to the interrupt handling system unit 38 for processing. Interrupt handling system 38 comprises interrupt logic that processes both analysis interrupts and non-analysis interrupts. The emulation system 36 and the interrupt handling system 38 are described in greater detail below. In one embodiment, digital signal processor 10 may include separate storage registers for storing return addresses associated with processing interrupts. Separate storage registers enhance the performance of processor 10.

Digital signal processor 10 may include a central processing unit 12, a program memory 14, a data memory 16, peripherals 18, and additional peripherals 20. Program memory 14 may be selectable for use as program memory or program cache. Peripherals 18 may include devices such as serial ports and/or timers. Additional peripherals 20 may include, for example, an external memory interface or a direct memory access controller. Program memory 14, data memory 16, peripherals 18, and additional peripherals 20 provide support to the central processing unit 12 to enable digital signal processor 10 to perform its tasks.

Central processing unit 12 may access data memory 16 through connections 17 and may access program memory 14 through connection 19. Program memory 14, data memory 16, peripherals 18, and additional peripherals 20 may be linked together through connections 21. As discussed in greater detail below, interrupt unit 38 may access peripherals 18 through connection 33. The receipt and processing of analysis interrupt signals by digital signal processor 10 may be handled by the central processing unit 12.

Central processing unit 12 may comprise a program fetch unit 22, an instruction dispatch unit 24, an instruction decode unit 26, a data path unit 28, a control register file 30, a control logic unit 32, a test unit 34, an emulation unit 36, an interrupt unit 38, and a power down unit 60. Processing occurs in data path unit 28. Data path unit 28 may include two data paths 39 and 41. Data path 39 may include four functional units 44, 46, 48, and 50. Data path 39 further includes a register file 40. Register file 40 may include sixteen thirty-two bit registers. Data path 41 may include four functional units 52, 54, 56, and 58. Data path 41 further includes a register file 42. Register file 42 may include sixteen thirty-two-bit registers. Register files 40 and 42 may be connected by a cross path 59 so that the functional units in each may access operands from either register file 40, 42. Program fetch unit 22, instruction dispatch unit 24, and instruction decode unit 26 deliver instructions from the program memory 14 to the functional units 44, 46, 48, 50, 52, 54, 56, and 58 of data path unit 28. In one embodiment, functional unit 56 can read from and write to the control register file 30.

Control register file 30 allows configuration and control of various aspects of processor operation, including the processing of interrupts. Control register file 30 is illustrated in greater detail in FIG. 2. As discussed in greater detail below, the control register file 30 includes interrupt registers that cooperate to permit configurable priority and that provide locations for storing return addresses associated with processing an interrupt. In addition, as discussed in greater detail below, control register file 30 includes a register that allows manual setting of an analysis interrupt. The control logic unit 32 includes logic circuitry used in conjunction with the control register file 30 to configure and control various aspects of processor operation. The test unit 34 provides additional capability to the central processing unit 12 for testing. The power down unit 60 controls operations associated with reducing or terminating power utilized by the central processing unit 12.

In cooperation with other portions of the central processing unit 12, the emulation system 36 receives and detects the presence of analysis interrupts and transmits this information to interrupt system 38 for processing. The analysis interrupts detected by emulation system 36 may have a configurable priority. Emulation system 36 may detect analysis interrupts originated by host processor 43 through an access port 37. Access port 37 may be a Megamodule Test Access Port manufactured by Texas Instruments of Dallas, Tex. As discussed in greater detail below, emulation system 36 may also detect analysis interrupts generated manually by setting a bit in a register in central register file 30. Emulation system 36 passes analysis interrupts to interrupt handling system 38 for processing.

In cooperation with other portions of the contral processing unit 12, the interrupt handling system 38 processes analysis interrupts detected by emulation system 36 as well as non-analysis interrupts detected directly by interrupt system 38. Interrupt handling system 38 may be connected to processor pins 39 for receiving non-analysis interrupt requests from external devices 41. Interrupt handling system 38 may also process interrupts originated by peripherals 18 or 20, received through connection 33. Interrupt handling system 38 includes interrupt circuitry that receives information indicating an interrupt has been detected and in cooperation with other portions of the central processing unit 12 sets appropriate bits in interrupt registers within control register file 30 to process the interrupt.

In one embodiment, digital signal processor 10 is operable to process three categories of interrupts: reset interrupts, non-maskable interrupts, and standard or maskable interrupts. According to the invention, the priority of analysis interrupts is configurable so that an analysis interrupt can be processed as either a non-maskable interrupt or a maskable interrupt. Immediate processing of reset interrupts cannot be prevented and are executed upon detection. Immediate processing of non-maskable interrupts normally is not prevented. Thus, a non-maskable interrupt is generally processed immediately. In a processor application that can tolerate delays in processing and in which timely analysis data is critical, it may be desirable for an analysis interrupt to have priority by making it non-maskable so that it is processed immediately upon detection. Standard or maskable interrupts can be prevented from causing interrupt processing. For example, processing is prevented if a higher priority interrupt is detected or is being processed. In a processor application that cannot tolerate delays in processing and in which timely analysis data is not critical, it may be desirable for an analysis interrupt to have a priority making it maskable so that processing of the analysis interrupt may be delayed.

Interrupts processed by digital signal processor 10 may be prioritized. According to one embodiment, digital signal processor 10 has fifteen available interrupts in addition to an analysis interrupt. These interrupts are represented by the symbols RESET, NMI, INT4, INT5, INT6, INT7, INT8, INT9, INT10, INT11, INT12, INT13, INT14, INT15, and MSGINT and are listed in order of priority. Thus, the RESET interrupt has the highest priority and the MSGINT interrupt has the lowest priority. The symbol NMI represents a non-maskable interrupt. The symbol MSGINT represents a message interrupt, which is the lowest priority interrupt. If two interrupts are received concurrently, higher priority interrupts are processed before lower priority interrupts. Additionally, higher priority interrupts may suspend processing of a lower priority interrupt even if the higher priority interrupt was received subsequent to the lower priority interrupt. Thus, processing of a low priority interrupt may be delayed while numerous other higher priority interrupts are processed. According to the invention, an analysis interrupt has a configurable priority to allow rapid processing of analysis interrupts when rapid processing of analysis interrupts is desirable and to allow more rapid processing of other interrupts when slower response for analysis interrupts is tolerable. According to one priority configuration, an analysis interrupt is non-maskable and has a priority just below the RESET interrupt but above the NMI interrupt. According to another priority configuration, an analysis interrupt has the second lowest priority, having a priority just above the MSGINT interrupt. The priority assigned to an analysis interrupt is stored in the contents of a register in the control register file 30, shown in FIG. 1.

Figure 2:
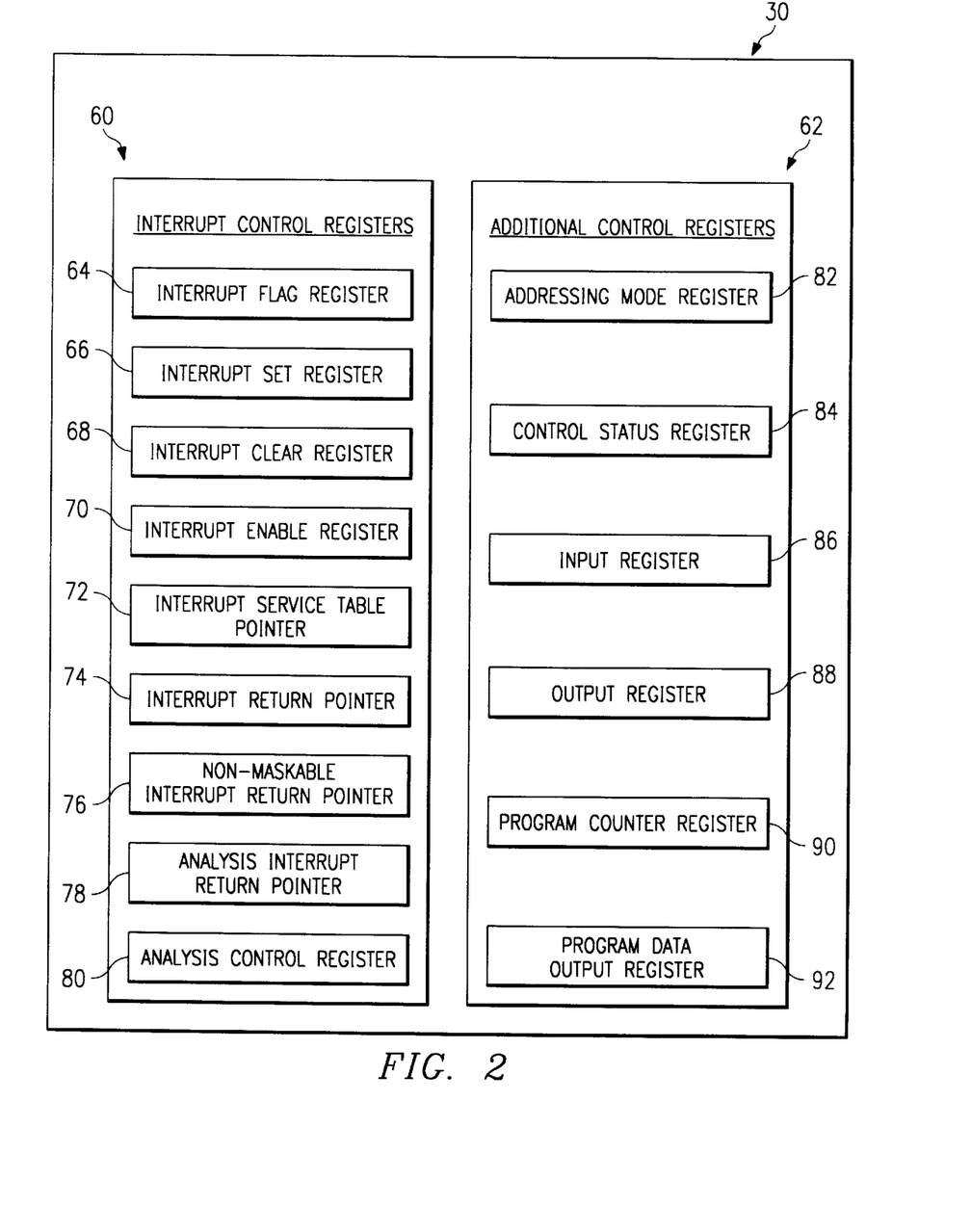
FIG. 2 is a block diagram showing contents of the control register file in the digital signal processor illustrated in FIG. 1.

FIG. 2 illustrates additional details of the control register file 30 shown in FIG. 1 according to one embodiment of the invention. Control register file 30 includes a plurality of control registers used to configure and control various aspects of processor operation, including interrupt handling and the priority of an analysis interrupt. In FIG. 2, control register file 30 is depicted as divided into two categories of registers. Interrupt control registers 60 include registers directly related to interrupts. Additional control registers 62 include registers relating primarily to functions other than interrupts. However, as discussed in greater detail below, some control registers 62 are related to interrupts.

Interrupt control registers 60 may include interrupt flag register 64, interrupt set register 66, interrupt clear register 68, interrupt enable register 70, interrupt service table pointer 72, interrupt return pointer 74, non-maskable interrupt return pointer 76, analysis control register 80, and analysis interrupt return pointer 78. Interrupt control registers 60 cooperate to facilitate processing of interrupts, including analysis interrupts.

Figure 3:
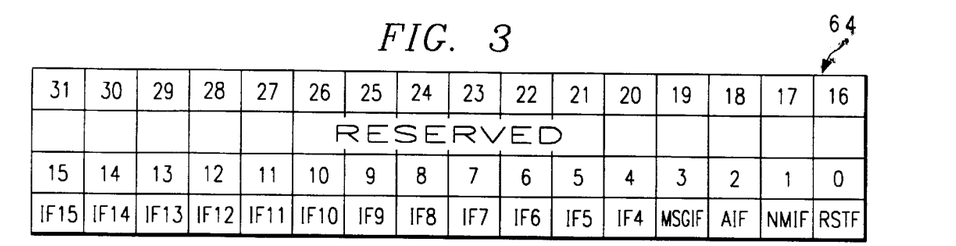
FIG. 3 illustrates additional details of the interrupt flag register shown in FIG. 2.

Interrupt flag register 64 contains the status of interrupts and is illustrated in greater detail in FIG. 3. In one embodiment, interrupt flag register 64 comprises thirty-two bits. Bits four through fifteen contain interrupt flags corresponding to interrupts INT4 through INT15, respectively. If an interrupt flag corresponding to an interrupt is one, the interrupt is currently being processed. If an interrupt flag corresponding to an interrupt is zero, the interrupt is not being processed. Bit two of the interrupt flag register stores the analysis interrupt flag indicating the status of an analysis interrupt. Bit one of the interrupt flag register 64 contains an interrupt flag corresponding to the non-maskable interrupt, NMI. Bit zero of the interrupt flag register 64 contains an interrupt flag corresponding to the reset interrupt, RESET. Bit three of the interrupt flag register 64 contains an interrupt flag corresponding to a message interrupt, MSGINT. When an analysis interrupt is being processed, bit two of the interrupt flag register is set to one by the interrupt handling system 38 in cooperation with other portions of the central processing unit 12.

Figure 4:
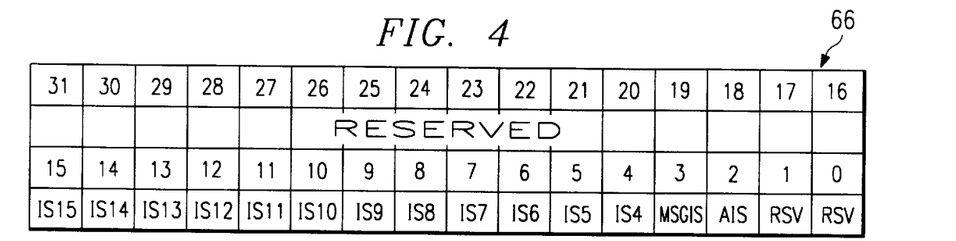
FIG. 4 illustrates additional details of the interrupt set register shown in FIG. 2.
Figure 5:
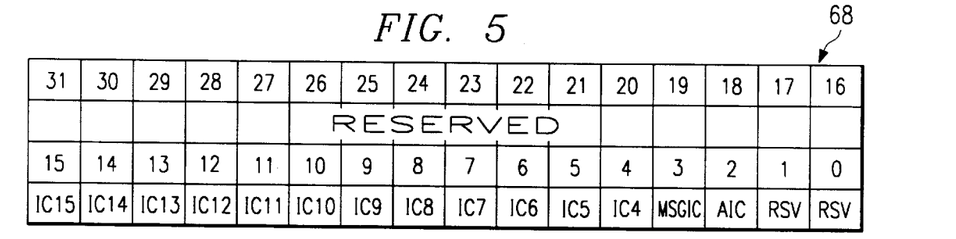
FIG. 5 illustrates additional details of the interrupt clear register shown in FIG. 2.

Interrupt set register 66 allows a user to manually set an interrupt and is illustrated in greater detail in FIG. 4. In one embodiment of the invention, writing a one to a bit in the interrupt set register 66 causes the corresponding interrupt to be set. Writing a zero to any bit of the interrupt set register has no effect. Bit two of the interrupt enable register stores an interrupt set bit corresponding to an analysis interrupt. An analysis interrupt may be manually set by writing a one to bit two of the interrupt set register 66. The ability to manually generate an analysis interrupt allows an end user to generate an analysis interrupt without modifying the processor's software operation code. Interrupt clear register 68 allows a user to manually clear an interrupt and is illustrated in greater detail in FIG. 5. Writing a one to a bit in the interrupt clear register 68 causes the corresponding interrupt to be set. Writing a zero to any bit of the interrupt set register has no effect. Bit two of the interrupt clear register stores an analysis clear corresponding to an analysis interrupt. An analysis interrupt may be manually cleared by writing a one to bit two of the interrupt set register 68.

Figure 6:
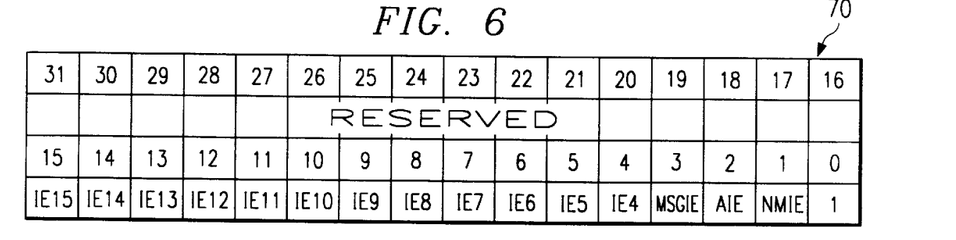
FIG. 6 illustrates additional details of the interrupt enable register shown in FIG. 2.

Interrupt enable register 70 allows enabling or disabling of individual interrupts and is illustrated in greater detail in FIG. 6. In one embodiment of the invention, an interrupt can only trigger processing if an interrupt enable parameter in the interrupt enable register 70 corresponding to the interrupt is set to one. Bit zero, which corresponds to a reset interrupt in the interrupt is not writable and is read as one. Thus, the reset interrupt, RESET, is immediately processed upon detection. All other interrupt enable parameters besides the interrupt enable parameter corresponding to the non-maskable interrupt NMI may be written one or zero, enabling or disabling the associated interrupt, respectively. The non-maskable interrupt enable bit, which is stored in bit one, is unaffected by a write of zero but is set by a write of one. The non-maskable interrupt enable bit, if set, disables all non-reset interrupts, preventing interruption of the non-maskable interrupt, NMI. However, an analysis interrupt with high priority is not disabled by the non-maskable interrupt enable parameter. Bit two of the interrupt enable register stores the analysis interrupt enable parameter. In one embodiment of the invention, the effect of the analysis interrupt enable parameter stored in bit two of the interrupt enable register 70 is dependent upon the priority given the corresponding analysis interrupt. If the analysis interrupt has a high priority, the analysis interrupt enable parameter stored in bit two of the interrupt enable register 70 operates in a similar manner to that of the non-maskable interrupt enable parameter. If the analysis interrupt enable parameter is set to one, all other non-reset interrupts, including the non-maskable interrupt, NMI, are disabled, preventing interruption of the analysis interrupt. If the analysis interrupt has a low priority, the analysis interrupt is enabled or disabled by writing a one or zero to the analysis interrupt enable parameter, respectively. When an analysis interrupt has a low priority, the analysis interrupt enable parameter has no effect on processing of other interrupts.

The address in program memory 14 of an interrupt service table may be stored in the interrupt service table pointer 72. The service table pointer 72 is illustrated in FIG. 2. The interrupt service table pointer 72 provides addresses for interrupt service fetch packets stored in program memory 14. An interrupt service fetch packet is a fetch packet used to service an interrupt. The interrupt service fetch packet allows reading instructions from program memory 14, which are in turn executed by processor 12.

Interrupt return pointer register 74, shown in FIG. 2, stores the address used to return from a maskable interrupt such as interrupt INT4. The interrupt return pointer register 74 may store the address of the first execute packet in the program flow that was not executed because of a maskable interrupt. Non-maskable interrupt return pointer register 76 may store the address used to return from a non-maskable interrupt such as interrupt NMI. The non-maskable interrupt return pointer 76 contains the address of the first execute packet in the program flow that was not executed because of a non-maskable interrupt. A non-maskable interrupt return pointer 76 distinct from the interrupt return pointer register 74 is desirable because a non-maskable interrupt may interrupt a maskable interrupt. Analysis interrupt return pointer register 78 may store the address used to return from an analysis interrupt. Regardless of the priority of the analysis interrupt, the return address for an analysis interrupt is saved in the analysis interrupt return pointer 78. A distinct analysis interrupt return pointer register 78 from interrupt return pointer register 74 and non-maskable interrupt return pointer register 76 is desirable because the address used to return from an analysis interrupt may otherwise overwrite the values in either the interrupt return pointer register 74 or the non-maskable interrupt return pointer register 76. Interrupt return pointer 74, non-maskable interrupt return pointer 76, and analysis return pointer 78 therefore allow digital signal processor 10 to return to the point of processing that digital signal processor 10 was before encountering an interrupt. The use of separate return pointers eliminates the need for a stack to store multiple possible return addresses. Therefore, because the use of a stack for storing return addresses conventionally requires a significant number of memory accesses, which slows processor performance, the use of the separate return pointers for each type of interrupt enhances processor performance.

Figure 7:
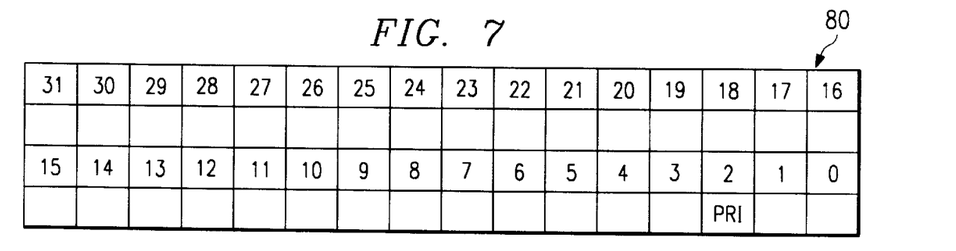
FIG. 7 illustrates additional details of the analysis control register shown in FIG. 2.

The analysis control register 80 contains control and status bits for emulation and analysis and is illustrated in greater detail in FIG. 7. In one embodiment of the invention, analysis control register 80 stores an analysis interrupt priority parameter PRI, which is used to designate the priority of an analysis interrupt. In the embodiment illustrated in FIG. 7, the analysis interrupt priority bit PRI is stored in bit two of the analysis control register 80; however, analysis interrupt priority bit PRI could be stored in other sortable locations. By setting the analysis interrupt priority bit PRI, an analysis interrupt can be treated either as a second non-maskable interrupt, having a higher priority level than all interrupts except the reset interrupt, RESET, or the second lowest priority maskable interrupt, having a priority higher than only the message interrupt, MSGINT. In systems in which analysis must react to events as quickly as possible, the non-maskable mode may be desirable. In other systems in which analysis must disrupt the program flow as little as possible, the maskable, low priority mode may be desirable and PRI should be set to zero to designate the lower priority. Other combinations of priority levels may be designated for configurable interrupts without departing from the invention. For example, an analysis interrupt or other configurable interrupt may have two possible priorities with one priority level having a medium priority and the other priority level being low.

Figure 8:
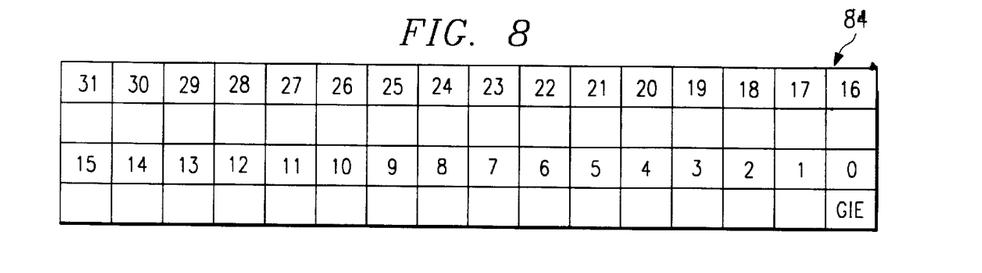
FIG. 8 illustrates additional details of the control status register shown in FIG. 2.

Additional control registers 62, illustrated in FIG. 2, include addressing mode register 82, control status register 84, general purpose input register 86, general purpose output register 88, program counter register 90, and program data output register 92. The control status register 84 directly affects the processing of the interrupts. Control status register 84 stores a global interrupt enable parameter GIE in bit zero of the control status register 84 and is illustrated in greater detail in FIG. 8. Global interrupt enable parameter GIE allows a user to disable all interrupts except non-maskable interrupts and the reset interrupt. Except for non-maskable interrupts and the reset interrupt, the global interrupt enable parameter GIE must be one for the interrupt to be processed. In one embodiment, the effect of the global interrupt enable parameter GIE on an analysis interrupt is determined by the priority of the analysis interrupt. If the analysis interrupt has a high priority, the global interrupt enable parameter GIE has no effect on the analysis interrupt. Thus, the analysis interrupt operating with high priority is non-maskable by the global interrupt enable parameter GIE. If the analysis interrupt is low priority, the global interrupt enable bit GIE must be set to one to allow processing of the analysis interrupt.

Figure 9A:
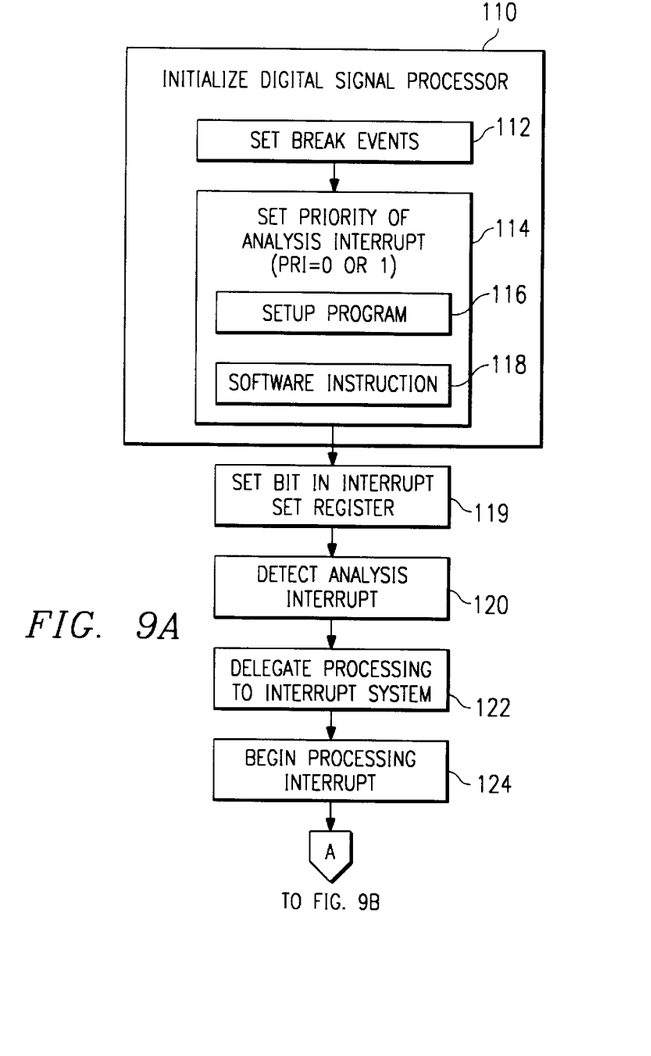
FIGS. 9a and 9b show a flow chart illustrating the processing of an interrupt according to the invention.
Figure 9B:
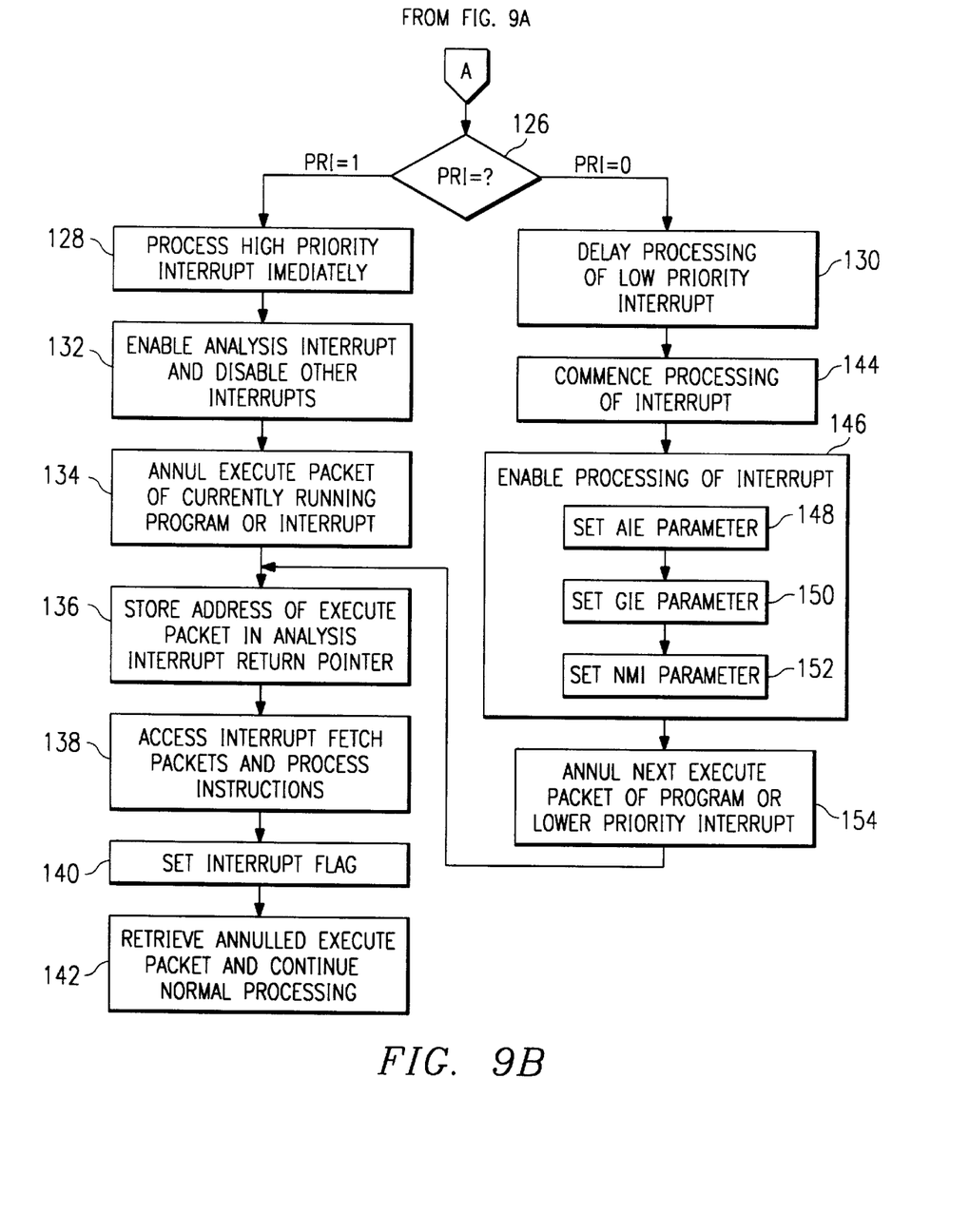

The processing of analysis interrupts may be understood with reference to FIGS. 1 through 9. FIG. 9 is a flow chart illustrating an exemplary process of detection and processing of an analysis interrupt. At step 110 the digital signal processor is initialized. Initialization may include the step 112 of modifying the operation code of digital signal processor 10 to set particular break events that will initiate an analysis interrupt. For example, the digital signal processor 10 may break and initiate an analysis interrupt when a particular address in program memory 14 has a particular value. As another example, an analysis interrupt may be initiated by host processor 43. Initialization may also include the step 114 of setting the priority of an analysis interrupt. In one embodiment, if a high priority is desired for an analysis interrupt, the analysis interrupt priority parameter, PRI, stored in the analysis control register 80, which is located within the control register file 30, is set to one. If a low priority analysis interrupt is desired, the analysis interrupt priority parameter, PRI, is set to zero. The analysis interrupt priority parameter, PRI, may be set during initialization by a setup program, as shown at step 116. Thus during setup, the priority of an analysis interrupt can be set as high or low, depending upon the anticipated needs of the digital signal processor 10. Alternatively, a user may change the priority for an analysis interrupt after initialization by a software instruction, as indicated at step 118.

After the priority of an analysis interrupt is specified, the digital signal processor 10 operates to perform its functions until detecting an interrupt. As discussed above, the analysis interrupt could be generated, for example, due to a particular value in a particular portion of the program memory 14, or due to an analysis interrupt generated by a host processor, such as host processor 43. Alternatively, as illustrated at step 119 an analysis interrupt could be manually generated by a user by setting the appropriate bit in the analysis interrupt set register 66. In one embodiment an analysis interrupt is set manually by writing a one to bit two of the interrupt set register. In any of these cases, emulation system 36 detects an analysis interrupt at step 120 and at step 122 delegates the processing of the analysis interrupt to the interrupt handling system 38.

At step 124, processing of the detected analysis interrupt by the interrupt handling system 38 begins. At step 126, the priority an analysis interrupt is given is based on the priority parameter PRI located in bit two of the analysis control register 80, which is contained within the control register file 30 of digital signal processor 10. If the interrupt analysis priority parameter PRI is set to one, the analysis interrupt is given high priority. If the analysis interrupt analysis interrupt is given high priority, the analysis interrupt is processed immediately at step 128. If the interrupt priority bit PRI is set to zero, the analysis interrupt is given low priority and processing is delayed until all other pending interrupts are taken, as illustrated at step 130.

At step 132, processing of an analysis interrupt given a high priority continues with enabling processing of the analysis interrupt and disabling processing of non-reset interrupts. Enabling processing of the analysis interrupt is accomplished by writing a one to the analysis interrupt enable parameter stored in bit two of the interrupt enable register 70 shown in FIG. 6. In one embodiment, unlike low priority analysis interrupts, it is not necessary to set to one the global interrupt enable bit GIE stored in the control status register 84, shown in FIG. 8, in order to enable processing of the high priority analysis interrupt. At step 134 processing of the analysis interrupt continues by annulling the next execute packet to interrupt the program flow, thus causing interruption of a program or another interrupt. The address of the execute packet that is annulled is loaded into the analysis interrupt return pointer 78 at step 136. The address of executed packets that are annulled due to processing of non-analysis interrupts are stored, as discussed above, in either the interrupt return pointer 74 or the non-maskable interrupt return pointer 76. Thus, the processor 10 can return to the appropriate point in processing a program or a lower priority interrupt without the use of a stack, thereby enhancing the performance of the processor. At step 138 the address for the interrupt fetch packets is accessed from the interrupt service fetch packet table and the instructions stored in program memory 14 associated with the analysis interrupt are executed. At step 140, the interrupt flag corresponding to an analysis interrupt, which is stored in bit two of the interrupt flag register 64, is set to one, indicating an analysis interrupt is being processed. After the instructions associated with the analysis interrupt are executed, at step 142 normal processing is recommenced by retrieving the annulled execute packet from the address stored in the analysis interrupt return pointer 78 and processing either an interrupted lower priority interrupt or a program that was interrupted by the analysis interrupt.

At step 144, processing of an analysis interrupt with a low priority commences after processing of all higher priority pending interrupts. At step 146, processing of the analysis interrupt is enabled. One step 148 in enabling processing of an analysis interrupt is setting to one the analysis interrupt enable parameter stored in bit two of the interrupt enable register 70, shown in FIG. 6. In one embodiment, unlike processing of analysis interrupts with a high priority, setting the analysis interrupt enable parameter to one for a low priority analysis interrupt does not disable processing of other non-reset interrupts. Thus, subsequent higher priority interrupts may interrupt an analysis interrupt when the analysis priority parameter PRI is zero. In addition, to enable processing of the analysis interrupt enable bit, the global interrupt enable bit stored in bit zero of the control status register 84 is set to one at step 150. Unlike processing of analysis interrupts having a high priority, it is necessary in one embodiment of the invention to set the global interrupt enable bit to enable processing of low priority analysis interrupts. If the non-maskable interrupt enable parameter stored in bit one of the interrupt enable register 70 is zero, all other non-reset interrupt are disabled, therefore the non-maskable interrupt enable parameter is additionally set to one at step 152 to enable processing of the analysis interrupt. At step 154, processing of the analysis interrupt continues by annulling the next execute packet in the program flow, thus interrupting a program or the MSGINT interrupt, which is the only interrupt with a priority less than the analysis interrupt when the analysis interrupt priority parameter PRI is zero. The remaining steps associated with processing a low priority analysis interrupt are the same as those discussed above in conjunction with processing a high priority analysis interrupt.

Although the invention has been particularly shown and described by the foregoing detailed description, it will be understood by those skilled in the art that various other changes in form and detail may be made without departing from the spirit and scope of the invention.

What is claimed is:

1. A method for interrupting processing by a processor, the method comprising the steps of:

requesting an analysis interrupt by setting a bit in a register in the processor, the bit associated with an analysis interrupt, the analysis interrupt having a first, configurable priority level;

detecting the analysis interrupt request;

assigning a second priority level to the analysis interrupt from a range of priority levels, depending upon said first priority level; and processing the analysis interrupt based on said first priority level and on said second priority level.

2. The method of claim 1 wherein the step of assigning a second priority level to the analysis interrupt further comprises the steps of:

assigning a first priority level to the interrupt if a priority parameter within the processor has a first value; and assigning a second priority level to the interrupt if the priority parameter within the processor has a second value.

3. The method of claim 1 wherein the step of requesting an analysis interrupt comprises setting a bit in a interrupt set register.

4. The method of claim 1, further comprising withdrawing a request for an analysis interrupt by setting a bit in an interrupt clear register.

5. A method for interrupting processing by a processor, the method comprising the steps of:

requesting an analysis interrupt by setting a bit in a register in the processor, the bit associated with an analysis interrupt, the analysis interrupt having a configurable priority;

detecting the analysis interrupt request;

assigning an assigned priority level to the analysis interrupt from a range of priority levels; and processing the analysis interrupt based on the assigned priority level, wherein the step of processing the analysis interrupt based on the assigned priority level comprises:

interrupting processing of a program; and storing an address associated with resuming the program in an analysis return pointer register, the analysis return pointer register operable to store addresses solely associated with resuming programs interrupted by an analysis interrupt.

6. The method of claim 5 wherein the step of storing an address associated with resuming the program in an analysis return pointer register comprises storing an address associated with resuming processing of a lower priority interrupt.

7. A method for interrupting processing by a processor, the method comprising the steps of:

requesting an analysis interrupt by setting a bit in a register in the processor, the bit associated with an analysis interrupt, the analysis interrupt having a configurable priority;

detecting the analysis interrupt request;

assigning an assigned priority level to the analysis interrupt from a range of priority levels; and processing the analysis interrupt based on the assigned priority level, and further comprising the steps of:

detecting a maskable non-analysis interrupt and initiating processing of the maskable non-analysis interrupt;

interrupting processing of a first program in response to detecting the maskable non-analysis interrupt;

storing an address associated with resuming processing of the first program in an interrupt return pointer register;

detecting a non-maskable non-analysis interrupt and initiating processing of the non-maskable non-analysis interrupt;

interrupting processing of the maskable non-analysis interrupt in response to detecting a non-maskable non-analysis interrupt;

storing an address associated with resuming processing of the maskable non-analysis interrupt in a non-maskable interrupt return pointer register;

wherein the step of processing the analysis interrupt comprises the steps of interrupting processing of the non-maskable non-analysis interrupt in response to detecting the analysis interrupt and storing an address associated with resuming processing of the non-maskable non-analysis interrupt in an analysis interrupt return pointer register; and wherein the interrupt return pointer register, the non-maskable interrupt return pointer register, and the analysis interrupt return pointer registers are separate registers.

8. A method for receiving and handling requests for attention of a processor comprising the steps of:

selecting a first priority level for a first configurable analysis interrupt from a range of interrupt priority levels;

detecting the first configurable analysis interrupt;

interrupting processing of a program based on the priority level selected for the first configurable analysis interrupt in response to detecting the first configurable analysis interrupt;

storing an address associated with resuming the program in an analysis return pointer register, the analysis return pointer register operable to store addresses solely associated with resuming programs interrupted by a configurable analysis interrupt;

selecting a second priority level for a second configurable analysis interrupt from a range of interrupt priority levels, the second priority level different from the first priority level;

detecting the second configurable analysis interrupt; and processing the second configurable analysis interrupt based on the priority level of the second configurable interrupt.

9. The method of claim 8 further comprising the step of requesting a configurable analysis interrupt.

10. The method of claim 8 and further comprising withdrawing a request for an analysis interrupt by setting a bit in an interrupt clear register in the processor.

11. The method of claim 8 wherein the program comprises a program executed in response to detecting a non-maskable non-analysis interrupt and further comprising steps of:

interrupting processing of a second program in response to detecting a non-maskable non-analysis interrupt; and storing an address associated with resuming processing of the second program in a non-maskable interrupt return pointer register.

12. The method of claim 11 wherein the second program comprises a second program executed in response to detecting a maskable interrupt and further comprising the steps of interrupting processing of a third program in response to detecting a maskable interrupt; and storing an address associated with resuming processing of the third program in an interrupt return pointer register, the interrupt return pointer register, the analysis interrupt return pointer register, and the analysis interrupt return pointer registers being separate registers.

13. A method for receiving and handling requests for attention of a processor comprising the steps of:

selecting a first priority level for a first configurable analysis interrupt from a range of interrupt priority levels;

detecting the first configurable analysis interrupt;

interrupting processing of a program based on the priority level selected for the first configurable analysis interrupt in response to detecting the first configurable analysis interrupt;

storing an address associated with resuming the program in an analysis return pointer register, the analysis return pointer register operable to store addresses solely associated with resuming programs interrupted by a configurable analysis interrupt;

selecting a second priority level for a second configurable analysis interrupt from a range of interrupt priority levels the second priority level different from the first priority level;

detecting the second configurable analysis interrupt; and processing the second configurable analysis interrupt based on the priority level of the second configurable interrupt, and further comprising requesting a configurable analysis interrupt by changing a value of a number stored within the processor.

14. The method of claim 13 wherein the step of requesting a configurable analysis interrupt comprises setting a bit in an interrupt set register in the processor.

15. A processor comprising:

a memory unit; and a central processing unit operable to access the memory unit, the central processing unit comprising:

an interrupt priority parameter storage system for storing an interrupt priority parameter;

a configurable interrupt detection system operable in combination with the central processing unit to detect a configurable interrupt;

an interrupt handling system operable in combination with the central processing unit to process a detected configurable analysis interrupt with a first priority level if the interrupt priority parameter has a first value and further operable to process the detected configurable analysis interrupt with a second priority level if the interrupt priority parameter has a second value, the first priority level different from the second priority level and the first value different from the second value; and at least three separate interrupt return pointer registers for storing addresses associated with resuming processing of the processor interrupted by an interrupt.

16. The processor of claim 15 wherein the three separate interrupt return pointer registers are stored within the interrupt handling system.

17. The processor of claim 15 wherein the at least three separate interrupt return pointer registers comprise:

an interrupt return pointer register associated with processing of non-analysis maskable interrupts;

a non-maskable interrupt return pointer register associated with processing of non-analysis non-maskable interrupts; and an analysis interrupt return pointer register associated with processing of analysis interrupts.

18. The processor of claim 15 and further comprising an interrupt set register for initiating an analysis interrupt.

19. The processor of claim 18 wherein the interrupt set register is stored within the interrupt handling system.

20. The processor of claim 15 and further comprising a means for manually initiating an analysis interrupt.

21. A method for interrupting processing by a processor, the method comprising the steps of:

requesting an analysis interrupt by setting a bit in a register in the processor, the bit associated with an analysis interrupt, the analysis interrupt having a configurable priority;

detecting the analysis interrupt request;

assigning an assigned priority level to the analysis interrupt from a range of priority levels, said range comprising three or more priority levels; and processing the analysis interrupt based on the assigned priority level.

* * * * *